United States Patent
Van Schoyck et al.

(10) Patent No.: US 10,778,967 B2
(45) Date of Patent: Sep. 15, 2020

(54) SYSTEMS AND METHODS FOR IMPROVING PERFORMANCE OF A ROBOTIC VEHICLE BY MANAGING ON-BOARD CAMERA DEFECTS

(71) Applicant: QUALCOMM Incorporated, San Diego, CA (US)

(72) Inventors: Travis Van Schoyck, Lafayette Hill, PA (US); Daniel Warren Mellinger, III, Philadelphia, PA (US); Michael Joshua Shomin, Philadelphia, PA (US); Jonathan Paul Davis, Philadelphia, PA (US); Ross Eric Kessler, Philadelphia, PA (US); Michael Franco Taveira, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

(21) Appl. No.: 15/685,221

(22) Filed: Aug. 24, 2017

(65) Prior Publication Data

US 2019/0068962 A1    Feb. 28, 2019

(51) Int. Cl.
*H04N 7/00*     (2011.01)
*H04N 17/00*    (2006.01)
(Continued)

(52) U.S. Cl.
CPC ......... *H04N 17/002* (2013.01); *B64C 39/024* (2013.01); *G01C 21/165* (2013.01);
(Continued)

(58) Field of Classification Search
CPC ............ B64C 39/024; B64C 2201/108; B64C 2201/141; B64C 2201/027;
(Continued)

(56) References Cited

U.S. PATENT DOCUMENTS 8,213,737 B2     7/2012  Steinberg et al.
2003/0151673 A1* 8/2003  Hashimoto ......... H04N 5/3675
                                         348/220.1
(Continued)

FOREIGN PATENT DOCUMENTS

CN          201266177 Y      7/2009

OTHER PUBLICATIONS

International Search Report and Written Opinion—PCT/US2018/044974—ISA/EPO—dated Nov. 13, 2018, 14 pages.
(Continued)

*Primary Examiner* — Masum Billah
(74) *Attorney, Agent, or Firm* — The Marbury Law Group, PLLC

(57) ABSTRACT

Embodiments include methods performed by a processor of a robotic vehicle for detecting and responding to defects on an on-board imaging device that includes an image sensor. Various embodiments may include causing the imaging device to capture at least one image, determining whether a defect to the imaging device is detected based at least in part on the at least one captured image, and, in response to determining that a defect to the imaging device is detected, identifying an area of the image sensor corresponding to the defect and masking image data received from the identified area of the image sensor.

25 Claims, 6 Drawing Sheets

(51) Int. Cl.

| | |
|---|---|
| *G08G 5/00* | (2006.01) |
| *G01C 21/16* | (2006.01) |
| *G01C 21/20* | (2006.01) |
| *G06T 7/73* | (2017.01) |
| *H04N 5/232* | (2006.01) |
| *B64C 39/02* | (2006.01) |
| *G05D 1/00* | (2006.01) |
| *G06K 9/00* | (2006.01) |
| *G06K 9/03* | (2006.01) |
| *G06K 9/20* | (2006.01) |
| *G06T 7/00* | (2017.01) |
| *H04N 5/247* | (2006.01) |
| *B63B 35/00* | (2020.01) |
| *B64G 1/10* | (2006.01) |

(52) U.S. Cl.
CPC ........... *G01C 21/20* (2013.01); *G05D 1/0088* (2013.01); *G06K 9/0063* (2013.01); *G06K 9/036* (2013.01); *G06K 9/2054* (2013.01); *G06T 7/0002* (2013.01); *G06T 7/74* (2017.01); *G08G 5/0021* (2013.01); *G08G 5/0069* (2013.01); *H04N 5/23299* (2018.08); *H04N 5/247* (2013.01); *B63B 2035/007* (2013.01); *B64C 2201/141* (2013.01); *B64G 1/10* (2013.01); *G06T 2207/10032* (2013.01); *G06T 2207/30168* (2013.01); *G06T 2207/30252* (2013.01)

(58) Field of Classification Search
CPC .............. G06Q 10/0835; G06Q 50/28; B63B 2035/007; G01C 21/165; G01C 21/20; G01S 13/913

USPC ........................................................ 348/113
See application file for complete search history.

(56) References Cited

U.S. PATENT DOCUMENTS

| | | | |
|---|---|---|---|
| 2008/0247634 A1* | 10/2008 | Huang ................. | H04N 5/2257 382/149 |
| 2012/0000024 A1 | 1/2012 | Layton | |
| 2012/0082338 A1 | 4/2012 | Lane et al. | |
| 2014/0002675 A1* | 1/2014 | Duparre ............... | H04N 17/002 348/187 |
| 2014/0010408 A1* | 1/2014 | Irie .................... | G06K 9/00791 382/103 |
| 2014/0132565 A1 | 5/2014 | Lin et al. | |
| 2015/0009296 A1 | 1/2015 | Crona | |
| 2015/0213318 A1 | 7/2015 | Einecke et al. | |
| 2016/0144505 A1 | 5/2016 | Fong et al. | |
| 2016/0210757 A1 | 7/2016 | Lavoie et al. | |
| 2018/0184063 A1* | 6/2018 | Burgess ............... | G11B 27/031 |
| 2019/0004543 A1* | 1/2019 | Kennedy ............... | G05D 1/101 |
| 2019/0068829 A1 | 2/2019 | Van Schoyck et al. | |

OTHER PUBLICATIONS

Yamashita A., et al., "Removal of Adherent Noises from Image Sequences by Spatia-Temporal Image Processing", 2008 IEEE International Conference on Robotics and Automation, Jan. 1, 2008 (Jan. 1, 2008), XP055193227, pp. 2386-2391.

* cited by examiner

SYSTEMS AND METHODS FOR IMPROVING PERFORMANCE OF A ROBOTIC VEHICLE BY MANAGING ON-BOARD CAMERA DEFECTS

BACKGROUND

Aerial robotic vehicles may be used for a variety of surveillance, reconnaissance, and exploration tasks for military and civilian applications. Such robotic vehicles may carry a payload configured to perform a variety of different activities desired by operators, such as capturing aerial images/video, participating in remote control racing, etc. Robotic vehicles, such as aerial vehicles, have are becoming increasingly popular for civilian use, and represent an increasing market for developing non-military uses and applications for personal devices. For example, such robotic vehicles may carry a payload configured to perform a specific function desired by a user, such as deliver a package, capture aerial images or video, first person view racing, etc.

Autonomous flight modes have been developed in which the robotic vehicle may complete a mission without requiring a manual input or guidance from a user. To enable such capabilities, computer vision techniques have been integrated into the control systems of the robotic vehicles to enhance their navigation and guidance capabilities (e.g., vision based position and altitude control, visual inertial odometry, target tracking, etc.). To accomplish these techniques and ensure safe autonomous flight, the robotic vehicle may be configured to use data collected from various sensors, including at least one on-board camera. When an on-board camera is not operating properly, performance may be negatively impacted. In particular, even a small occlusion or defect on a camera lens or sensor can cause certain computer vision algorithms to fail, causing the robotic vehicle to become unstable and potentially crash.

SUMMARY

Various embodiments include methods performed by a processor of a robotic vehicle for detecting and responding to defects on an on-board imaging device that includes an image sensor. Various embodiments may include causing the imaging device to capture at least one image, determining whether a defect to the imaging device is detected based at least in part on the at least one captured image, and, in response to determining that a defect to the imaging device is detected, identifying an area of the image sensor corresponding to the defect and masking image data received from the identified area of the image sensor.

Some embodiments may further include continuing active operation of the robotic vehicle in response to determining that a defect to the imaging device is detected. In some embodiments, continuing active operation of the robotic vehicle may include navigating the robotic vehicle using the image data received from a remaining area of the image sensor.

Some embodiments may further include altering at least one of an operating mode or a flight path of the robotic vehicle based on the remaining area of the image sensor. In some embodiments, continuing active operation of the robotic vehicle may include utilizing a second image device of the robotic vehicle to perform navigation. In some embodiments, the imaging device may further include at least one lens.

In some embodiments, masking image data received from the identified area of the image sensor may include excluding use of an area of pixels on the image sensor. In some embodiments, excluding use of an area of pixels on the image sensor may include excluding use of each pixel within the identified area of the image sensor. In some embodiments, excluding use of an area of pixels on the image sensor may include excluding use of a region of the image sensor in which the identified area is located.

Some embodiments may further include causing motion of the on-board imaging device. In some embodiments, causing motion of the imaging device may include causing movement of the robotic vehicle. In some embodiments, causing motion of the imaging device may include causing rotation of a gimbal on which the imaging device is mounted.

In some embodiments, the at least one image captured by the imaging device may be an image of a reference element. In some embodiments, determining whether a defect to the imaging device is detected may include comparing features of the captured image of the reference element to features of a baseline image of the reference element, and determining whether the features differ between the captured image and the baseline image by more than a threshold amount in any region of the captured image.

In some embodiments, the at least one captured image may be two temporally-separated images. In some embodiments, determining whether a defect to the imaging device is detected may include identifying features within the temporally-separated images, and determining whether any identified feature maintains a fixed position between the temporally-separated images. In some embodiments, determining whether a defect to the imaging device is detected may be further based on data received from an inertial sensor of the robotic vehicle.

Further embodiments include a robotic vehicle including a processor configured to perform operations of any of the methods summarized above. Various embodiments include a processing device for use in a robotic vehicle that is configured with processor-executable instructions to perform operations of any of the methods described above. Various embodiments also include a non-transitory processor-readable medium on which is stored processor-executable instructions configured to cause a processor of a robotic vehicle to perform operations of any of the methods described above. Various embodiments include a robotic vehicle having means for performing functions of any of the methods described above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
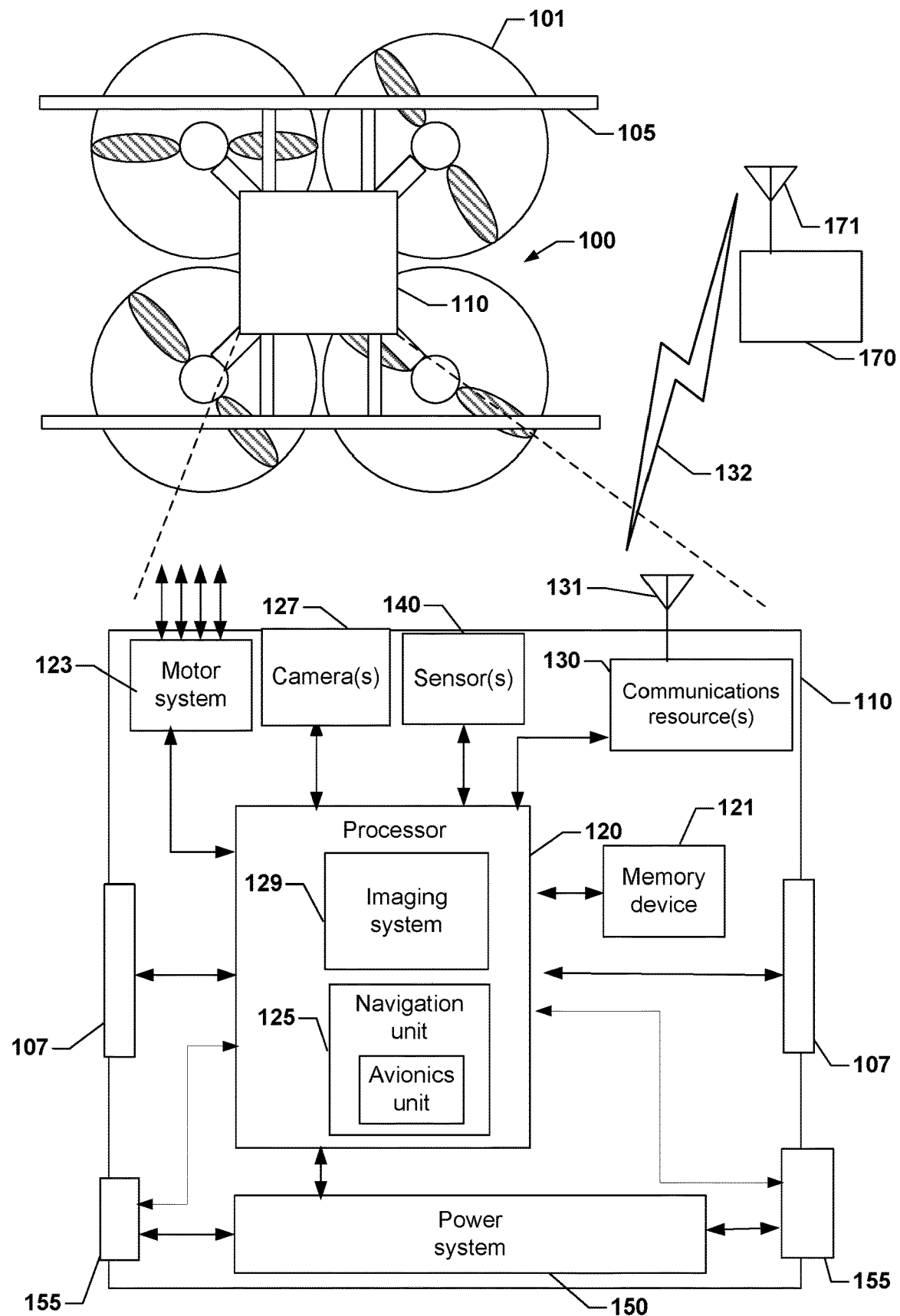
FIG. 1 is a block diagram illustrating components of a typical robotic vehicle system suitable for use in the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods performed by a processor of a robotic vehicle for improving performance of the robotic vehicle by detecting the presence of a defect on the lens or image sensor of an on-board imaging device (e.g., camera), and automatically adjusting use of the on-board camera in response. Non-limiting examples of such defects may include a scratch on the image sensor, or a scratch, crack, smudge, dirt, rain droplet, or other blemish on the lens, as well as failed or failing pixels in the image sensor. Defect detection in various embodiments may be performed for one or more on-board camera, such as a primary camera that is used to run computer vision algorithms (e.g., visual inertial odometry) for flight and navigation of the robotic vehicle. Automatically adjusting use of the on-board camera with a lens or image sensor defect may include ignoring, excluding or masking pixels affected by a detected defect during image processing or analysis. In this manner, the defect detection in various embodiments may prevent errors in robotic vehicle navigation or collisions.

In various embodiments, the robotic vehicle processor may cause motion of an on-board camera, which may be based on movement of the robotic vehicle itself during active operation (e.g., flight) or on rotating the camera (i.e., mechanical gimbal rotation). The robotic vehicle processor may prompt the on-board camera to capture at least one image, which may involve capturing an image of a known reference element or capturing two or more images of the surrounding environment at different times. The processor may identify and compare features within the at least one captured image. In embodiments in which the on-board camera captured an image of a known reference element, such comparison may be to features within an existing baseline image of the reference element.

In embodiments in which the on-board camera captured images of the surrounding environment at different times, such comparisons may be between two such captured images. Based on the feature comparisons between images, the robotic vehicle processor may identify any regions in the captured image(s) that represent defects.

For example, between images that are successively captured in time, the robotic vehicle processor may identify any region in which a feature maintains a fixed position as representing a defect. In an example using an image of a known reference element, the robotic vehicle processor may identify any region in which features differ from those in a baseline image of the same reference element by more than a threshold amount.

For any identified region in the captured image(s), the robotic vehicle processor may identify a corresponding area of the image sensor and/or lens of the on-board camera that contains the defect.

In response to detecting a defect in the image sensor and/or lens of an on-board camera, the robotic vehicle processor may take any of a number of actions to modify use of the on-board camera. In some embodiments, the robotic vehicle processor may exclude image data received from the affected area of the image sensor (i.e., the area or pixels that contains the defect or is associated with the defect area of the lens). This is referred to herein as "masking" the defect. By masking the defect, the robotic vehicle processor may minimize the impact of the defect on operations of the robotic vehicle (e.g., navigation). The robotic vehicle processor may also change the operation mode or other parameters for controlling navigation to better suit the remaining image data (i.e., the portions of the image not masked).

As used herein, the terms "robotic vehicle" and "drone" refer to one of various types of vehicles including an onboard computing device configured to provide some autonomous or semi-autonomous capabilities. Examples of robotic vehicles include but are not limited to: aerial vehicles, such as an unmanned aerial vehicle (UAV); ground vehicles (e.g., an autonomous or semi-autonomous car, a vacuum robot, etc.); water-based vehicles (i.e., vehicles configured for operation on the surface of the water or under water); space-based vehicles (e.g., a spacecraft or space probe); and/or some combination thereof. In some embodiments, the robotic vehicle may be manned. In other embodiments, the robotic vehicle may be unmanned. In embodiments in which the robotic vehicle is autonomous, the robotic vehicle may include an onboard computing device configured to maneuver and/or navigate the robotic vehicle without remote operating instructions (i.e., autonomously), such as from a human operator (e.g., via a remote computing device). In embodiments in which the robotic vehicle is semi-autonomous, the robotic vehicle may include an onboard computing device configured to receive some information or instructions, such as from a human operator (e.g., via a remote computing device), and autonomously maneuver and/or navigate the robotic vehicle consistent with the received information or instructions. In some implementations, the robotic vehicle may be an aerial vehicle (unmanned or manned), which may be a rotorcraft or winged aircraft. For example, a rotorcraft (also referred to as a multirotor or multicopter) may include a plurality of propulsion units (e.g., rotors/propellers) that provide propulsion and/or lifting forces for the robotic vehicle. Specific non-limiting examples of rotorcraft include tricopters (three rotors), quadcopters (four rotors), hexacopters (six rotors), and octocopters (eight rotors). However, a rotorcraft may include any number of rotors.

As used herein, the terms "camera," "imaging system," and "imaging device" refer to any optical apparatus adapted to capture images by an optical assembly, such as a lens system, store the images, and/or relay the images to another unit or system. Images captured by the imaging device may be still images that may be part of moving images such as video. In various embodiments, the imaging device may operate on light in the visible spectrum or in other ranges such as infrared. While referred to as a camera, an imaging device in various embodiments described herein may be any of a camera, a camera module, a video camera, a laser light detection and ranging (LIDAR) sensor etc. In various embodiments, the robotic vehicle may include multiple imaging devices for implementing stereo vision by providing depth perception As used herein, the term "defect" refers to (but is not limited to) the effect of a scratch, abrasion, crack, fingerprint, dirt, water, foliage, or other artifact on a lens, on a transparent cover in front of the lens, on an imaging sensor within the area within the frame of capture on the imaging device, and/or any other component that may be affected by the presence of such detect. Depending on the application of the imaging device, detection of defects in various embodiments may be performed with respect to a primary camera used for navigation, and/or may be performed with respect to one or more other camera that is specifically used for high resolution image and/or video capture.

Typical robotic vehicles may be configured to rely on computer vision or other sensing techniques to perceive and navigate within a surrounding environment. To enable a processor of a robotic vehicle to navigate autonomously with high reliability, the level of detail and accuracy with which the surroundings are perceived is important. Imaging devices, such as cameras, are increasingly employed to provide these capabilities to robotic vehicles. To ensure overall system reliability, such imaging devices should process image signals even under adverse conditions encountered in outdoor applications. However, the lenses of on-board cameras may become obstructed by smudges, contamination, scratches, scuffs, dirt, or other defects during operations of the robotic vehicle. Foreign material on or defects within camera lenses may distort images and create problems in operations and applications that rely on the images (e.g., computer vision algorithms).

Various embodiments enable the detection of materials or defects on camera lenses and initiating an action in response. Various embodiments may be useful with any of a number of robotic vehicles, examples of which include aerial robotic vehicles, unmanned autonomous land vehicles, unmanned autonomous watercraft, and autonomous spacecraft. Various embodiments may be particularly useful for aerial robotic vehicles due to their high mobility, exposure to conditions that can mar a camera lens or the like (e.g., airborne insects), and increasing applications and numbers of aerial robotic vehicles.

An example of an aerial robotic vehicle 100 illustrated in FIG. 1 is a "quad copter" having four horizontally configured rotary lift propellers 101 and motors fixed to a frame 105. The frame 105 may support a controller 110, landing skids and the propulsion motors, power source (power unit 150) (e.g., battery), payload securing mechanism (payload securing unit 107), and other components.

The robotic vehicle 100 may include a control unit 110. The control unit 110 may include a processor 120, communication resource(s) 130, sensor(s) 140, and a power unit 150. The processor 120 may be coupled to a memory unit 121 and a navigation unit 125. The processor 120 may be configured with processor-executable instructions to control flight and other operations the robotic vehicle 100, including operations of the various embodiments. In some embodiments, the processor 120 may be coupled to a payload securing unit 107 and landing unit 155. The processor 120 may be powered from a power unit 150, such as a battery. The processor 120 may be configured with processor-executable instructions to control the charging of the power unit 150, such as by executing a charging control algorithm using a charge control circuit. Alternatively or additionally, the power unit 150 may be configured to manage charging. The processor 120 may be coupled to a motor system 123 that is configured to manage the motors that drive the rotors 101. The motor system 123 may include one or more propeller drivers. Each of the propeller drivers may include a motor, a motor shaft, and a propeller.

Through control of the individual motors of the rotors 101, the robotic vehicle 100 may be controlled in flight. In the processor 120, a navigation unit 125 may collect data and determine the present position and orientation of the robotic vehicle 100, the appropriate course towards a destination, and/or the best way to perform a particular function.

An avionics component 129 of the navigation unit 125 may be configured to provide flight control-related information, such as altitude, attitude, airspeed, heading and similar information that may be used for navigation purposes. The avionics component 129 may also provide data regarding the orientation and accelerations of the robotic vehicle 100 that may be used in navigation calculations. In some embodiments, the information generated by the navigation unit 125, including the avionics component 129, depends on the capabilities and types of sensor(s) 140 on the robotic vehicle 100.

The control unit 110 may include at least one sensor 140 coupled to the processor 120, which can supply data to the navigation unit 125 and/or the avionics unit 129. For example, sensors 140 may include inertial sensors, such as one or more accelerometers (sensing accelerations), one or more gyroscopes (providing rotation sensing readings), one or more magnetometers or compasses (providing directional orientation information), or any combination thereof. Sensors 140 may also include a barometer that may use ambient pressure readings to provide approximate altitude readings (e.g., absolute elevation level) for the robotic vehicle 100. Inertial sensors may provide navigational information, e.g., via dead reckoning, including at least one of the position, orientation, and velocity (e.g., direction and speed of movement) of the robotic vehicle 100.

The control unit 110 may include at least one camera 127 and an imaging system 129. The imaging system 129 may be implemented as part of the processor 120, or may be implemented as a separate processor, such as an ASIC, a FPGA, or other logical circuitry. For example, the imaging system 129 may be implemented as a set of executable instructions stored in the memory device 121 that execute on a processor 120 coupled to the at least one camera 127. Each of the cameras 127 may include sub-components other than image capturing sensors, including auto-focusing circuitry, ISO adjustment circuitry, and shutter speed adjustment circuitry, etc.

The control unit 110 may include communication resource(s) 130, which may be coupled to at least one antenna 131 and include one or more transceiver. The transceiver(s) may include any of modulators, de-modulators, encoders, decoders, encryption modules, decryption modules, amplifiers, and filters. The communication resource(s) 130 may receive control instructions (e.g., navigational mode toggling, trajectory instructions, general settings, etc.) from one or more wireless communication device 170.

In some embodiments, the sensors 140 may also include a satellite navigation system receiver. The terms "Global Positioning System" (GPS) and "Global Navigation Satellite System" (GNSS) are used interchangeably herein to refer to any of a variety of satellite-aided navigation systems, such as Global Positioning System (GPS) deployed by the United States, GLObal NAvigation Satellite System (GLONASS) used by the Russian military, and Galileo for civilian use in the European Union, as well as terrestrial communication systems that augment satellite-based navigation signals or provide independent navigation information. A GPS receiver may process GNSS signals to provide three-dimensional coordinate information of the robotic vehicle 100 to the navigation unit 125.

Alternatively or in addition, the communication resource(s) 130 may include one or more radio receiver for receiving navigation beacon or other signals from radio nodes, such as navigation beacons (e.g., very high frequency (VHF) omnidirectional range (VOR) beacons), Wi-Fi access points, cellular network sites, radio station, etc. In some embodiments, the navigation unit 125 of the processor 120 may be configured to receive information from a radio resource (e.g., 130).

In some embodiments, the robotic vehicle may use an alternate source of positioning signals (i.e., other than GNSS, GPS, etc.). Because robotic vehicles often fly at low altitudes (e.g., below 400 feet), the robotic vehicle may scan for local radio signals (e.g., Wi-Fi signals, Bluetooth signals, Cellular signals, etc.) associated with transmitters (e.g., beacons, Wi-Fi access points, Bluetooth beacons, small cells (e.g., picocells, femtocells, etc.), etc.) having known locations such as beacons or other signal sources within restricted or unrestricted areas near the flight path. The robotic vehicle 100 may use location information associated with the source of the alternate signals together with additional information (e.g., dead reckoning in combination with last trusted GNSS/GPS location, dead reckoning in combination with a position of the robotic vehicle takeoff zone, etc.) for positioning and navigation in some applications. Thus, the robotic vehicle 100 may navigate using a combination of navigation techniques, including dead-reckoning, camera-based recognition of the land features below the robotic vehicle (e.g., recognizing a road, landmarks, highway signage, etc.), etc. that may be used instead of or in combination with GNSS/GPS location determination and triangulation or trilateration based on known locations of detected wireless access points.

The processor 120 and/or the navigation unit 125 may be configured to communicate with a wireless communication device 170 through a wireless connection (e.g., a cellular data network) via a communication resource (e.g., a radio frequency (RF) resource) 130 to receive assistance data from the server and to provide robotic vehicle position information and/or other information to the server. The communication resource(s) 130 may include a radio configured to receive communication signals, navigation signals, signals from aviation navigation facilities, etc., and provide such signals to the processor 120 and/or the navigation unit 125 to assist in robotic vehicle navigation tasks.

The processor 120 may use a radio (e.g., 130) to conduct wireless communications with one or more wireless communication device 170 such as smartphone, tablet, or other device with which the robotic vehicle 100 may be in communication. A bi-directional wireless communication link 132 may be established between transmit/receive antenna 131 of the communication resource(s) 130 and transmit/receive antenna 171 of the wireless communication device 170. For example, the wireless communication device 170 may be a portable or wearable device of an operator that the robotic vehicle is configured to track. In some embodiments, the wireless communication device 170 and robotic vehicle 100 may communicate through an intermediate communication link such as one or more network nodes or other communication devices. For example, the wireless communication device 170 may be connected to the robotic vehicle 100 through a cellular network base station or cell tower. The wireless communication device 170 may communicate with the robotic vehicle 100 through local access node or through a data connection established in a cellular network.

In some embodiments, the communication resource(s) 130 may be configured to switch between a cellular connection and a Wi-Fi connection depending on the position and altitude of the robotic vehicle 100. For example, while in flight at an altitude designated for robotic vehicle traffic, the communication resource(s) 130 may communicate with a cellular infrastructure to maintain communications with the wireless communication 170. An example of a flight altitude for the robotic vehicle 100 may be at around 400 feet or less, such as may be designated by a government authority (e.g., FAA) for robotic vehicle flight traffic. At this altitude, it may be difficult to establish communication with some of the wireless communication devices 170 using short-range radio communication links (e.g., Wi-Fi). Therefore, communications with the wireless communication device 170 may be established using cellular telephone networks while the robotic vehicle 100 is at flight altitude. Communication with the wireless communication device 170 may transition to a short-range communication link (e.g., Wi-Fi or Bluetooth) when the robotic vehicle 100 moves closer to the wireless communication device 170.

While the various components of the control unit 110 are illustrated in FIG. 1 as separate components, some or all of the components (e.g., the processor 120, the motor control unit 123, the communication resource(s) 130, and other units) may be integrated together in a single device or unit, such as a system-on-chip.

Figure 2:
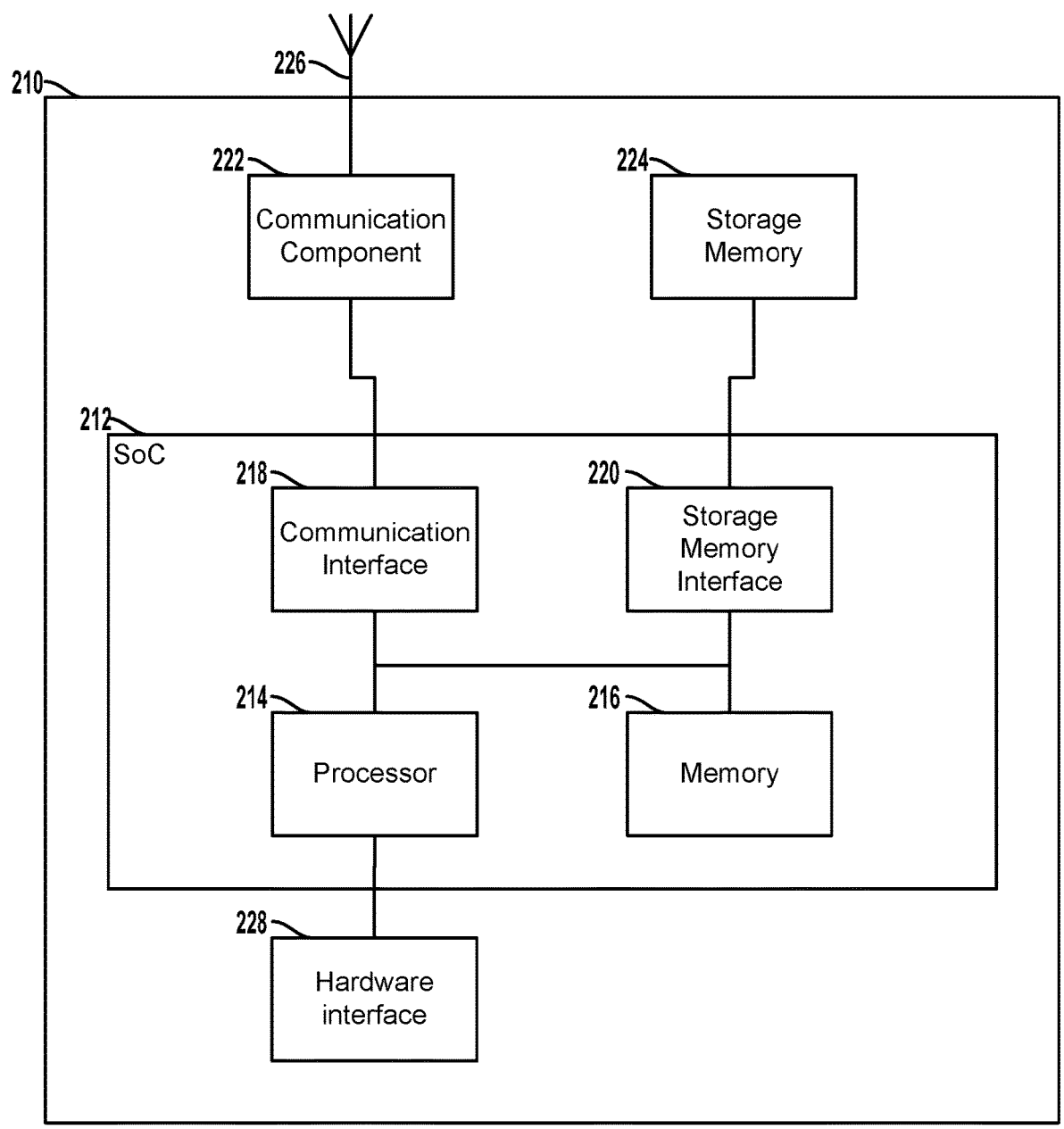
FIG. 2 is a component block diagram illustrating a processing device suitable for implementing various embodiments.

Various embodiments may be implemented within a processing device 210 configured to be used in a robotic vehicle. A processing device may be configured as or including a system-on-chip (SOC) 212, an example of which is illustrated FIG. 2. With reference to FIGS. 1-2, the SOC 212 may include (but is not limited to) a processor 214, a memory 216, a communication interface 218, and a storage memory interface 220. The processing device 210 or the SOC 212 may further include a communication component 222, such as a wired or wireless modem, a storage memory 224, an antenna 226 for establishing a wireless communication link, and/or the like. The processing device 210 or the SOC 212 may further include a hardware interface 228 configured to enable the processor 214 to communicate with and control various components of a robotic vehicle. The processor 214 may include any of a variety of processing devices, for example any number of processor cores.

The term "system-on-chip" (SoC) is used herein to refer to a set of interconnected electronic circuits typically, but not exclusively, including one or more processors (e.g., 214), a memory (e.g., 216), and a communication interface (e.g., 218). The SOC 212 may include a variety of different types of processors 214 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The SOC 212 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The SoC 212 may include one or more processors 214. The processing device 210 may include more than one SoC 212, thereby increasing the number of processors 214 and processor cores. The processing device 210 may also include processors 214 that are not associated with an SoC 212 (i.e., external to the SoC 212). Individual processors 214 may be multicore processors. The processors 214 may each be configured for specific purposes that may be the same as or different from other processors 214 of the processing device 210 or SOC 212. One or more of the processors 214 and processor cores of the same or different configurations may be grouped together. A group of processors 214 or processor cores may be referred to as a multi-processor cluster.

The memory 216 of the SoC 212 may be a volatile or non-volatile memory configured for storing data and processor-executable instructions for access by the processor 214. The processing device 210 and/or SoC 212 may include one or more memories 216 configured for various purposes. One or more memories 216 may include volatile memories such as random-access memory (RAM) or main memory, or cache memory.

Some or all of the components of the processing device 210 and the SOC 212 may be arranged differently and/or combined while still serving the functions of the various embodiments. The processing device 210 and the SOC 212 may not be limited to one of each of the components, and multiple instances of each component may be included in various configurations of the processing device 210.

Figure 3:
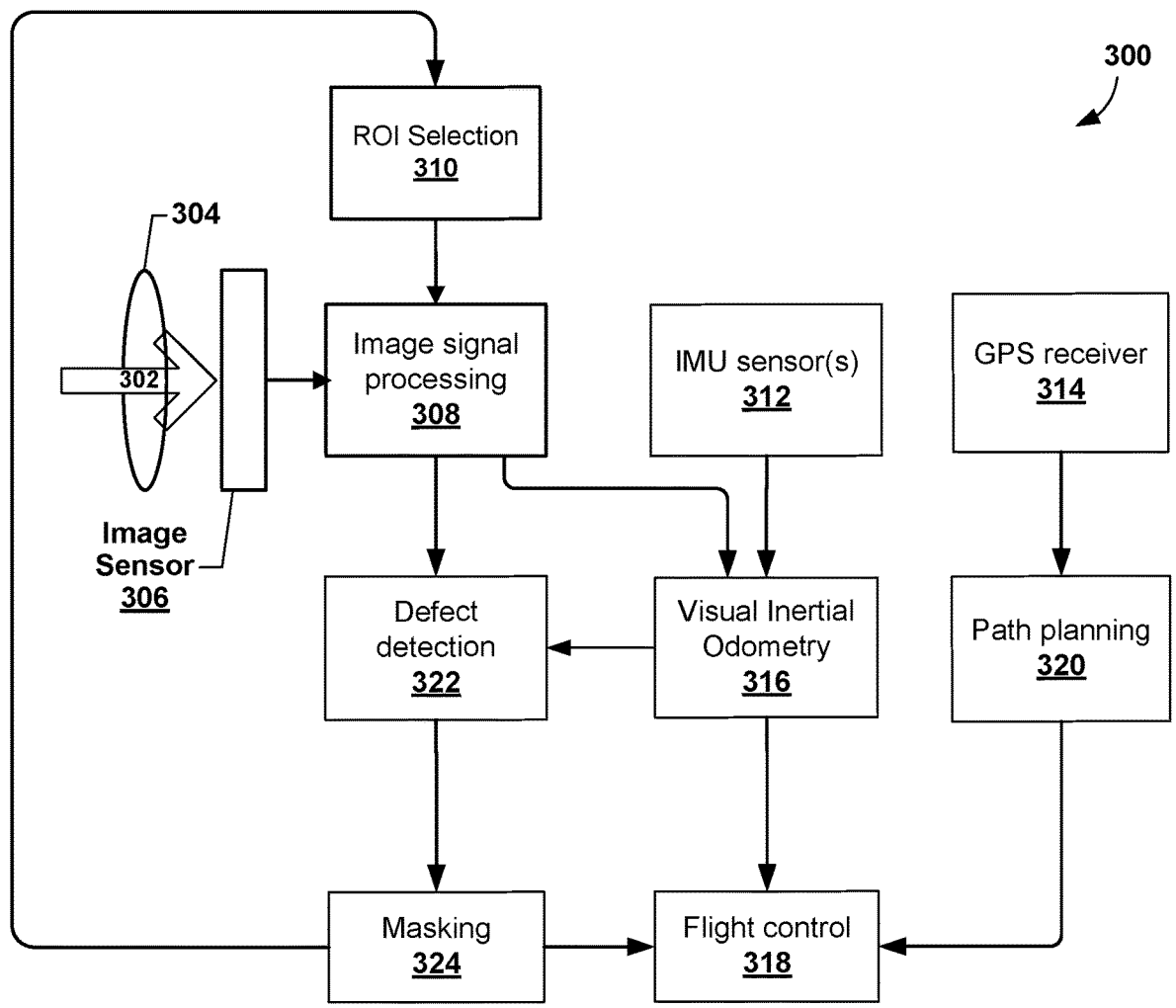
FIG. 3 is a block diagram illustrating components of a control system that utilizes imaging and inertial measurement to detect on-board camera defects of a robotic device according to various embodiments.

FIG. 3 is a functional block diagram of an example control system of a robotic vehicle that includes detecting and handling defects to an imaging device according to various embodiments. With reference to FIGS. 1-3, the control system 300 may be implemented on a processor of a robotic vehicle (e.g., 102, 200), such as a ground vehicle (e.g., car, vacuum robot, etc.), an aerial vehicle (e.g., UAV), etc.

In the control system 300, inputs may be received from multiple on-board sensors to enable the control system 300 to perform path planning, visual inertial odometry, and image device defect detection on the robotic vehicle.

The sensors (e.g., 140) in various embodiments may each have a predetermined sampling rate, which may be uniform and/or different from the sampling rates of other sensors positioned on the robotic vehicle. The sampling rates for selected from all the sensors may change under selected conditions, such as a rapid descent or change in acceleration. The number and type of sensors that may be monitored can vary between vehicles. In some embodiments, the collected flight sensor data may be transmitted as electrical signals from the sensor to a data processing and analysis unit that can save the raw sensor data in memory (e.g., the memory device 121, the memory 216, etc.). In some embodiments, the data processing and analysis units may filter the raw sensor data before analysis. The raw data and/or filtered data can be saved in a data recorded prior to, concurrently with, or subsequent to the analysis. In some embodiments, the sensors may filter the sensor data internally prior to transmission for data analysis. In some embodiments, the sensors may internally buffer sensor data for later transmission.

For example, at least one image sensor 306 may capture light of an image 302 that enters through one or more lens 304. The lens 304 may include a fish eye lens or another similar lens that may be configured to provide a wide image capture angle. The image sensor(s) 306 may provide image data to an image signal processing (ISP) unit 308. A region of interest (ROI) selection unit 310 may provide data to the ISP unit 308 for the selection of a region of interest within the image data. In some embodiments, the image sensor(s) 306 and lens 304 may be part of a visual camera. The lens 304, image sensor(s) 306, ISP unit 308, and ROI selection unit 310 may all be part of an on-board imaging device, such as a camera. In other embodiments, the imaging device may include more or fewer components.

In some embodiments, the sensors may also include at least one inertial measurement unit (IMU) sensor 312 for detecting orientation or other maneuvering data. The sensors may also include at least one GPS receiver 314 enabling the robotic vehicle to receive GNSS signals. Other sensors (not shown) may include (but are not limited to) at least one motion feedback sensor, such as a wheel encoder, pressure sensor, or other collision or contact-based sensor.

Data from the IMU sensor(s) 312 and/or from the ISP unit 308 of at least one camera may be provided to a visual inertial odometry (VIO) module 316. The VIO module 316 may calculate a current position of the robotic vehicle in six degrees of freedom. For example, the VIO module 316 may combine visual information, such as optical flow or feature tracking information, with inertial information, such as information from an accelerometer or gyroscope. The VIO module 316 may also combine distance and ground information, such as ultrasound range measurements, or 3D depth or disparity data. Output from the VIO module 316 may be provided to a flight control module 318, which may stabilize the robotic vehicle and may navigate the robotic device according to a calculated path of motion.

Data from the GPS receiver 314 and/or data from the IMU sensor(s) 312 may be provided to a path planning module 320, which may use the GPS signals to select, create, or update a navigation path, either alone or in conjunction with map(s). The navigation path may be provided to the flight control module 318.

A defect detection module 322 utilize information from the ISP unit 308 of one or more camera (e.g., a stereo camera, a structured light camera, or a time of flight camera, in embodiments in which the robotic vehicle is so equipped) to identify features in images that represent defects in the image sensor 306 or lens 304.

Such features may be low-level computer vision features detected using any of a number of techniques. For example, in features from accelerated segment test (FAST) corner detection, a circle of 16 pixels is used to classify whether a candidate center point is actually a corner. Specifically, if a set of contiguous pixels (e.g., 9 pixels) in the circle are all brighter or darker than the center pixel intensity by at least a threshold value, the candidate point is classified as a corner. Other corner detection methods that may be used include, for example, Harris corner detection.

In some embodiments, features may be detected within image data using algorithms that are typically employed in object recognition tasks. For example, some embodiments may utilize scale-invariant feature transform (SIFT) and/or speeded up robust features (SURF) algorithms, in which features are compared to a database of shapes.

In various embodiments, feature detection within image data may be improved by selecting well-distributed features. For example, an image or frame may be divided into a grid, and a number of features may be extracted from each section. Features identified in spaced apart sections may then be tracked from frame to frame for estimating motion, speed, and direction.

In some embodiments feature tracking techniques may be employed, such as multi-resolution (e.g., coarse-to-fine) tracking within image data. Feature tracking between images or frames may be improved in various embodiments by estimating a surface normal in a manner that accounts for appearance transformation between views.

In some embodiments, the defect detection module 322 may compare identified features within two or more images captured while the camera is moving to determine whether any features remained in a fixed position. In some embodiments, such fixed position features may be classified as representing defects. In some embodiments, the defect detection module 322 may check the fixed position features against data from the IMU sensor(s) 312 prior to classifying as defects. That is, the defect detection module 322 may use inertial information to ensure that elements in the surrounding environment were expected to change position relative to the robotic vehicle between the two images based on the robotic vehicle's movement.

In some embodiments, the defect detection module 322 may compare an image of a reference element to a baseline image of the reference element. The reference element may be, for example, a known component of the robotic vehicle itself, which may be captured by rotating a gimbal-mounted camera. Alternatively, the reference element may be a known feature or collection of features in the surrounding environment at a predetermined location, such as a home landing pad. The defect detection module 322 may identify regions of the captured image in which features differ from the baseline image by more than a threshold amount, which may be classified as representing defects.

In various embodiments, the comparison of features within a captured image of to those of another image (e.g., successively captured image or baseline image) may be performed by comparing pixels based on a luminance intensity or other visual property.

A region of the captured image that is classified as representing a defect may be defined on a per-pixel basis, or may be generalized based on groups of pixels. In some embodiments, the comparison of features within the captured image may be repeated a number of times before defining the region that is classified as a defect in order to ensure precision. In some embodiments, the defect may be further classified as temporary or permanent based on characteristics of the identified region. Non-limiting examples of temporary defects may include those that are relatively easy to remove (e.g., clean) such as dirt, water, fingerprints, etc. Non-limiting examples of permanent defects may include those that are generally not repairable such as a scratch, abrasion, crack, etc. For example, if the region of pixels representing a defect has straight edges or lines (or other characteristic of a scratch or the like), the defect detection module 322 may determine that the defect is a scratch, and therefore permanent. In another example, if the region of pixels representing the defect is irregular shape with no luminosity, the defect detection process 322 may determine that the defect is dirt, and therefore temporary. In some embodiments, the type of detect (permanent or not) may be input by a user. For example, the defect could be presented to the user (or otherwise notify the user of the existence of the defect), whereupon the user can correct the defect (e.g., clean the lens) or confirm the presence of a permanent defect.

In some embodiments, the permanence of the defect may be inferred by the defect detection module 322, for example, if the defect is detected continuously for an extended period of time (e.g., months) or if a cleaning was detected (e.g., some improvement because dirt was wiped off) and a portion of the defect remains.

The defect detection module 322 may provide information about any feature or part of a captured image that is classified as a defect to a masking module 324 to counteract the impact to operations of the robotic vehicle. In some embodiments, the masking module 324 may identify the region (e.g., pixels) of the image sensor 306 corresponding to the defect or the lens region with the defect, which may be determined based on the particular properties of the on-board camera. The masking module 324 may develop a protocol for preventing or minimizing use of image data received from the corresponding area of the lens or sensor. For example, the masking process 324 may provide instructions to the ISP unit 308 to discard or ignore image data from pixels in the defect area. In some embodiments, such instructions may identify specific pixels to be discarded or ignored. In some embodiments, such instructions may identify a rectangular region encompassing the defect or lens region with the defect. In some embodiments, such instruction may identify a pre-defined region (e.g., a quadrant of the image) in which the defect or lens region with the defect appears.

The masking module 324 may also provide instructions to the flight control module 318 based on determinations associated with the detection of defects. For example, the masking module 324 may determine whether the remaining image data processed by the ISP unit 308 is sufficient to continue normal operation of the robotic vehicle. If the remaining image data processed by the ISP unit 308 is insufficient for current normal operation, the masking process 324 may provide instructions to the flight control module 318 to make any of a number of adjustments, depending on the particular operations and capabilities of the vehicle. For example, the flight control module 318 may switch to a different on-board camera to provide information to the VIO module 316, which may be of different quality but provide more image data (or at least more reliable image data). In another example, the flight control module 318 may automatically switch operating modes, such as from a fully autonomous to a semi-autonomous mode or manual mode. In another example, the flight control module 318 may change the navigation path, change the landing location, etc.

In some embodiments, the defect detection module 322 may be configured to be repeated automatically during operation of the robotic vehicle in order to determine whether new defects are detected and/or whether any previously identified defects have been resolved. For example, the defect detection module 322 may be configured to start a countdown timer after completion, and to re-execute using received image data from the ISP unit once the countdown timer expires. As described, the defect detection module 322 may include classifying a defect as temporary or permanent. Therefore, in some embodiments, the re-execution of the defect detection module 322 may only be performed with respect to remaining image data received from the ISP unit 308 if the defect is permanent. Likewise in some embodiments, the re-execution can be manually triggered or in response to an event (e.g., changing of a camera component, changing of a non-camera component, flight event such as a collision, etc.).

Figure 4:
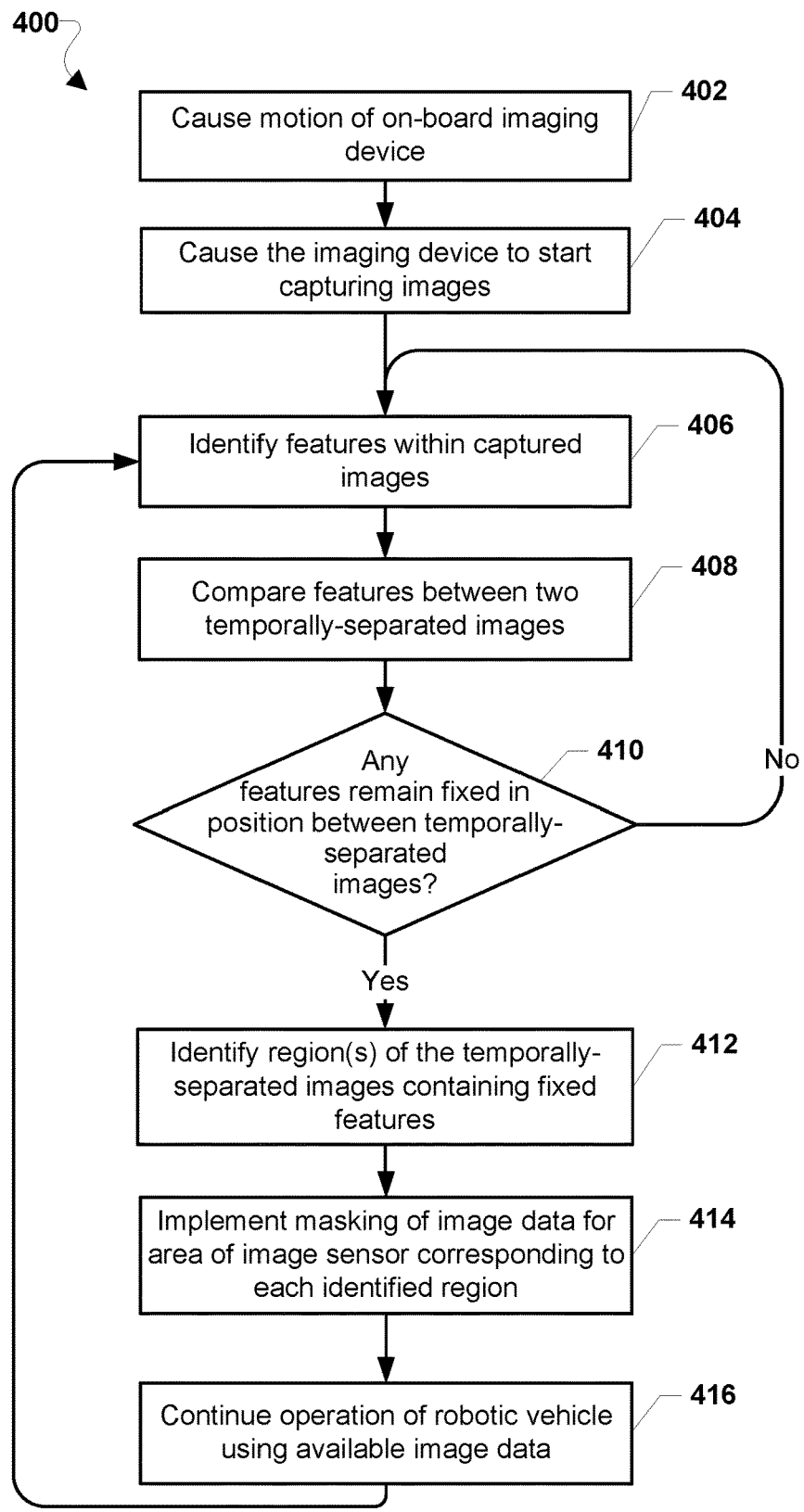
FIG. 4 is a process flow diagram illustrating a method for identifying defects to an on-board imaging capture system to control operations of a robotic vehicle according to various embodiments.

FIG. 4 illustrates a method 400 for customizing operating configurations for a robotic vehicle based on information about the operator according to various embodiments. With reference to FIGS. 1-4, the operations of the method 400 may be implemented by one or more processors associated with a robotic vehicle, such as the robotic vehicle 100, the processing device 210, or the SoC 212. The one or more processors associated with the robotic vehicle may include, for example, the processor(s) 120, 214, or a separate controller implemented by a wireless communication device.

In block 402, a processor of the robotic vehicle may cause motion of an on-board imaging device of the robotic vehicle. In some embodiments, causing motion of an imaging device may be performed by commanding motion of the entire robotic device. For example, the processor may execute instructions for the robotic device to begin active operation in order to carry out a mission (e.g., flight). In some embodiments, causing motion of the imaging device may be performed by commanding motion of just the imaging device. For example, for an imaging device that is configured on a gimbal, the processor may execute instructions to cause a specific rotation of the gimbal, thereby moving the imaging device.

In block 404, the processor may prompt the imaging device to start capturing images. In some embodiments, such image capture may be part of or associated with normal operation of the robotic device, such as during flight. For example, if the imaging device is a VIO camera, navigation of the robotic vehicle may require image capture for performing location and navigation functions based on computer visional algorithms. In some embodiments, prompting the imaging device to start capturing images may involve commanding image capture at additional times and/or of specific targets compared to normal operation for computer vision algorithms. For example, the imaging device may capture images at a short, predetermined time interval configured for defect detection.

In block 406, the processor may identify features within the captured images. In various embodiments, such features may include various shapes, objects, lines, or patterns within the captured image data As described, any of a number of suitable techniques may be used to perform feature identification, including approaches based on CAD-like object models, appearance-based methods (e.g., using edge matching, grayscale matching, gradient matching, histograms of receptive field responses, or large model bases), feature-based methods (e.g., using interpretation trees, hypothesizing and testing, pose consistency, pose clustering, invariance, geometric hashing, scale-invariant feature transform (SIFT), or speeded up robust features (SURF)), etc.

In block 408, the processor may compare features between two temporally-separated captured images on the robotic vehicle. In some embodiments, the temporally-separated captured images may have been separated captured during movement of the on-board camera, separated by a short time interval, depending on the speed of motion. In some embodiments, the temporally-spaced images may have been successively captured during movement of the on-board camera. Specifically, the time interval may be set to ensure that the field-of-view of the imaging device has changed between the two images. In some embodiments, the comparison of features between two temporally-separated images may be repeated using additional pairs of images in order to obtain precise information with a high level of accuracy.

In determination block 410, the processor may determine whether any features remain fixed in position between the temporally-separated images. In particular, the processor may determine whether any feature (e.g., shape, object, line, patterns etc.) is in the same position in both images, instead of moving with the rest of the field of view. As described, additional information may be employed to determine the expected movement of a feature within the field of view, such as IMU sensor data.

In response to determining that no features remain fixed in position between the temporally-separated images (i.e., determination block 410="No"), the processor may continue identifying features within captured images in block 402.

In response to determining that there is at least one feature that remains fixed in position between the temporally-separated images (i.e., determination block 410="Yes"), the processor may identify the region(s) in the temporally-separated images containing the fixed position feature(s) in block 412. As described, such identification may involve defining each region in the images that represents a defect on a per-pixel or group of pixels basis. In some embodiments, such identification may also include classifying the region as a permanent or temporary defect based on characteristics of the fixed position features (e.g., type of lines, type of luminosity differences, etc.).

In some embodiments, the comparison of features between two temporally-separated images and determination of whether any features remain fixed may be repeated using additional pairs of images in order to obtain precise information with a high level of accuracy.

In block 414, the processor may implement masking of image data for an area of the image sensor corresponding to each identified region. That is, the processor may identify an area of pixels on the image sensor within the imaging device that maps to the pixels of the identified region. In some embodiments, the processor may execute instructions or provide commands to the imaging device to ignore image data received from that area of the image sensor, thereby masking the effects areas associated with defects. In some embodiments, the masking may only apply to the image data that is employed for specific applications or tasks (e.g., computer vision algorithms for navigation).

In some embodiments, such masking may be performed with respect to just the affected pixels of the image sensor, including a buffer area of surrounding pixels. As a result, the size of an identified region in a captured image representing a defect may affect the size of the area of pixels to which image data masking is applied. The area of pixels to which masking is applied (i.e., pixels to be ignored) may be determined by the processor after identifying the region in the captured image representing the defect. In some embodiments, the processor may identify the specific pixels to which masking is applied (i.e., pixels to be ignored) as those pixels for which the image does not change as the robotic vehicle or image sensor moves. In some embodiments, the processor may identify the area to which masking is applied (i.e., pixels to be ignored) as those pixels for which the image does not change as the robotic vehicle or image sensor moves plus a margin or border of adjacent pixels.

In other embodiments, masking image data may involve a broader area of the image sensor that includes the affected pixels that are present. In some embodiments, the processor may determine a rectangular portion of the image sensor that encompasses the defect (i.e., includes all pixels for which the image does not change as the robotic vehicle or image sensor moves), and execute instructions or provide commands to ignore the identified rectangular portion. In some embodiments, the image sensor may be pre-divided into regions (e.g., quadrants or other number of regions) to enable the processor to identify an affected region to be entirely ignored by referring to an identifier of the affected pre-defined region. In such embodiments, the processor may determine the one or more pre-divided regions of the image sensor that include pixels for which the image does not change as the robotic vehicle or image sensor moves, and execute instructions or provide commands to ignore such region(s). For example, if an identified region representing a defect in a captured image maps to an area of pixels located in a corner of the image sensor, the processor may execute instructions or provide commands to ignore image data from the entire quadrant (or other defined section) of the image sensor containing that corner.

In block 416, the processor may continue operation of the robotic vehicle using available image data. In some embodiments, such continued operation may involve executing the same flight plan or mission with the same imaging device, but using only data from areas of the image sensor not associated with the defect (i.e., "remaining image data") in computer vision algorithms. In some embodiments, continued operation may involve altering an operating mode of the robotic vehicle to a mode that may perform better using a reduced volume of image data, or for example, an operating mode that may benefit from more human intervention or control. In some embodiments, continued operation may involve executing the same flight plan or mission, but using a different on-board imaging device, depending on the specific features of the robotic vehicle. In some embodiments, continued operation may involve using the same image device, but altering the flight plan (e.g., shortening, simplifying, etc.) to minimize the amount of time that the robotic vehicle is navigating using only the remaining image data.

The processor may continue to identify features within captured images in block 406. In some embodiments, the processor may wait a predetermined period of time before repeating feature identification for newly captured images. In some embodiments, image data on which feature identification is performed may be based on the type of defects that have been identified. For example, if an identified region within captured images was classified as a permanent defect, continuing to identify features within the captured images may be limited to only the remaining image data.

Figure 5:
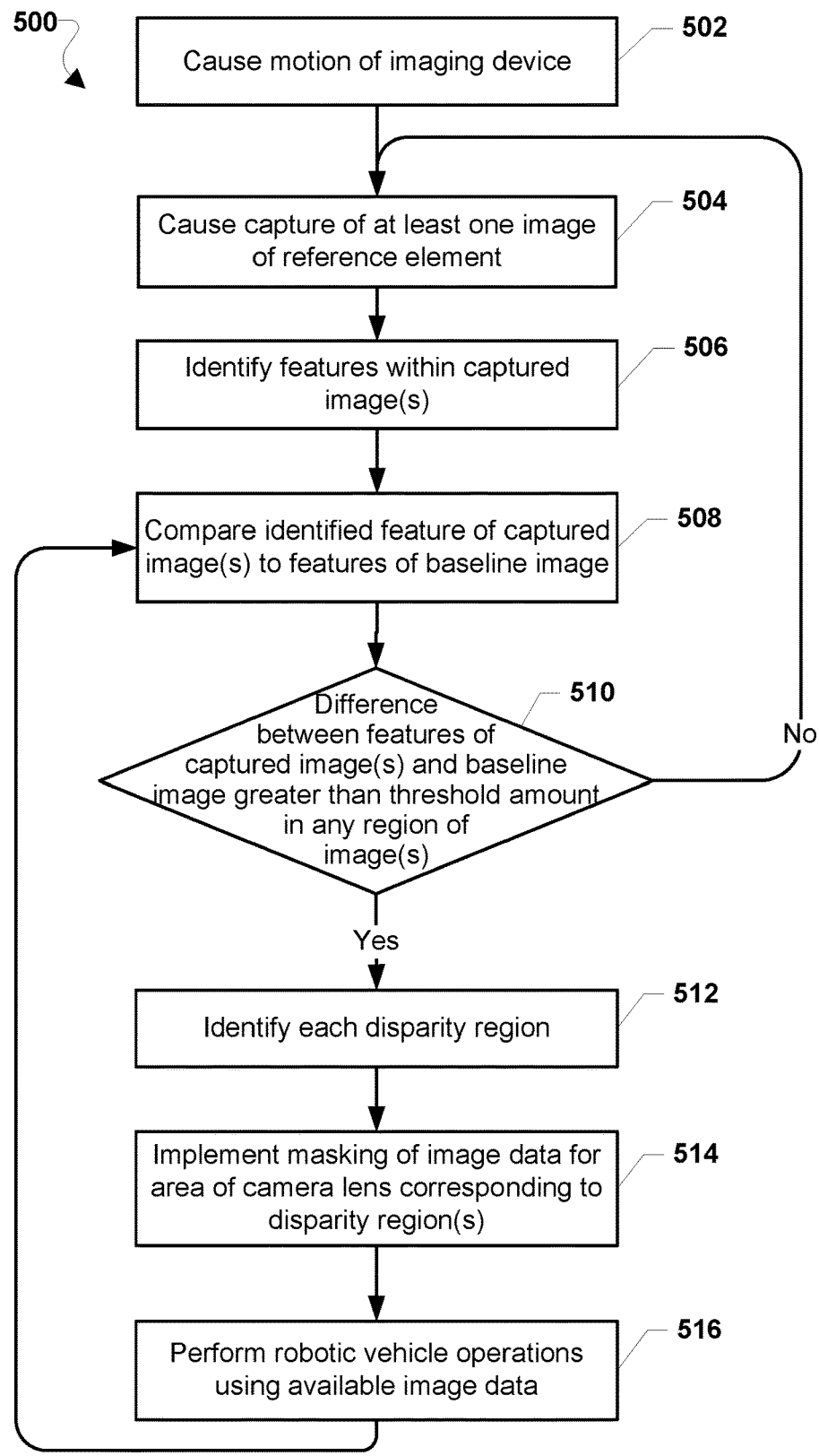
FIG. 5 is a process flow diagram illustrating a method for identifying defects to an on-board imaging capture system to control operations of a robotic vehicle.

FIG. 5 illustrates a method 500 for customizing operating configurations for a robotic vehicle based on information about the operator according to various embodiments. With referenced to FIGS. 1-5, the operations of the method 500 may be implemented by one or more processors associated with a robotic vehicle, such as the robotic vehicle 100, the processing device 210, or the SoC 212. The one or more processors associated with the robotic vehicle may include, for example, the processor(s) 120, 214, or a separate controller implemented by a wireless communication device.

In block 502, a processor associated with the robotic vehicle may cause motion of an on-board imaging device of the robotic vehicle. In some embodiments, causing motion of an imaging device may be performed by commanding motion of the entire robotic device. For example, the processor may execute instructions for the robotic device to begin active operation in order to carry out a mission (e.g., flight). In some embodiments, causing motion of the imaging device may be performed through motion of just the imaging device. For example, for an imaging device that is configured on a gimbal, the processor may execute instructions to cause a specific rotation of the gimbal, thereby moving the imaging device.

In block 504, the processor may prompt capture of at least one image of a reference element by the imaging device. In embodiments in which motion of the image device involves moving the robotic vehicle to a known location (e.g., a home landing pad), the reference element may be feature in the surrounding environment. In embodiments in which motion of the image device involves rotating the image device using a gimbal, the reference element may be a visible component of the robotic vehicle.

In block 506, the processor may identify features within the captured image(s). In various embodiments, such features may include various shapes, objects, lines, or patterns within the captured image data As described, any of a number of suitable techniques may be used to perform feature identification, including approaches based on CAD-like object models, appearance-based methods (e.g., using edge matching, grayscale matching, gradient matching, histograms of receptive field responses, or large model bases), feature-based methods (e.g., using interpretation trees, hypothesizing and testing, pose consistency, pose clustering, invariance, geometric hashing, scale-invariant feature transform (SIFT), or speeded up robust features (SURF)), etc.

In block 508, the processor may compare the identified feature of the captured image(s) to features of a baseline image. In various embodiments, the baseline image may be a previously obtained image of the reference element that is stored in memory of the robotic vehicle.

In determination block 510, the processor may determine whether the difference between identified features of the captured image(s) and features of the baseline image is greater than a threshold amount in any region of the captured image(s). In particular, the processor may determine whether any feature (e.g., shape, object, line, pattern, etc.) is sufficiently different between the captured image(s) of the reference element and its baseline image. As described, the differences between features in two images may be determined by comparing pixels based on a luminance intensity or other visual property. In various embodiments, the threshold amount may be set based on a confidence level and/or the capabilities of the imaging device.

In response to determining that the difference between identified features of the captured image(s) and features of the baseline image is not greater than the threshold amount (i.e., determination block 510="No") in any region, the processor may continue prompting capture of at least one image of the reference element by the imaging device in block 502.

In response to determining that the difference between identified features of the captured image(s) and features of the baseline image is greater than the threshold amount (i.e., determination block 510="Yes") in at least one region, the processor may identify each such region of the captured image(s) as a disparity region in block 512.

In block 514, the processor may implement masking of image data for an area of the image sensor corresponding to each disparity region. That is, the processor may identify an area of pixels on the image sensor within the imaging device that maps to the pixels of the identified disparity region. In some embodiments, the processor may execute instructions or provide commands to the imaging device to ignore image data received from that area of the image sensor, thereby masking the effects areas associated with defects. In some embodiments, the masking may only apply to the image data that is employed for specific applications or tasks (e.g., computer vision algorithms for navigation).

In some embodiments, such masking may be performed with respect to just the affected pixels of the image sensor, including a buffer area of surrounding pixels. As a result, the size of an identified region in a captured image representing a defect may affect the size of the area of pixels to which image data masking is applied.

In some embodiments, the processor may determine a rectangular area of the image sensor that encompasses the defect (i.e., includes all pixels for which the image does not change as the robotic vehicle or image sensor moves), and implement masking of the determined rectangular area. Such a determined rectangular area of the image sensor may be those pixels in a rectangular array that just encompass the defect. In some embodiments, the dimensions of the determined rectangular area may be consistent with the aspect ratio of the image sensor.

In some embodiments, the processor may determine a predefined area of the image sensor (e.g., a quadrant) that includes the affected pixels that are present), and implement masking of the identified predefined rectangular portion. For example, if an identified region representing a defect in a captured image maps to an area of pixels located in a corner of the image sensor, the processor may execute instructions or provide commands to ignore image data from the entire quadrant (or other defined section) of the image sensor containing that corner.

In block 516, the processor may continue operation of the robotic vehicle using available image data. In some embodiments, such continued operation may involve executing the same flight plan or mission with the same imaging device, but using only data from areas of the image sensor not associated with the defect (i.e., "remaining image data") in computer vision algorithms. In some embodiments, continued operation may involve altering an operating mode of the robotic vehicle to a mode that may perform better using a reduced volume of image data, or for example, an operating mode that may benefit from more human intervention or control. In some embodiments, continued operation may involve executing the same flight plan or mission, but using a different on-board imaging device, depending on the specific features of the robotic vehicle. In some embodiments, continued operation may involve using the same image device, but altering the flight plan (e.g., shortening, simplifying, etc.) to minimize the amount of time that the robotic vehicle is navigating using only the remaining image data.

The processor may continue to identify features within captured images in block 506. In some embodiments, the processor may wait a predetermined period of time before repeating feature identification for newly captured images.

In some embodiments, image data on which feature identification is performed may be based on the type of defects that have been identified. For example, if an identified region within captured images was classified as a permanent defect, continuing to identify features within the captured images may be limited to only the remaining image data.

Figure 6:
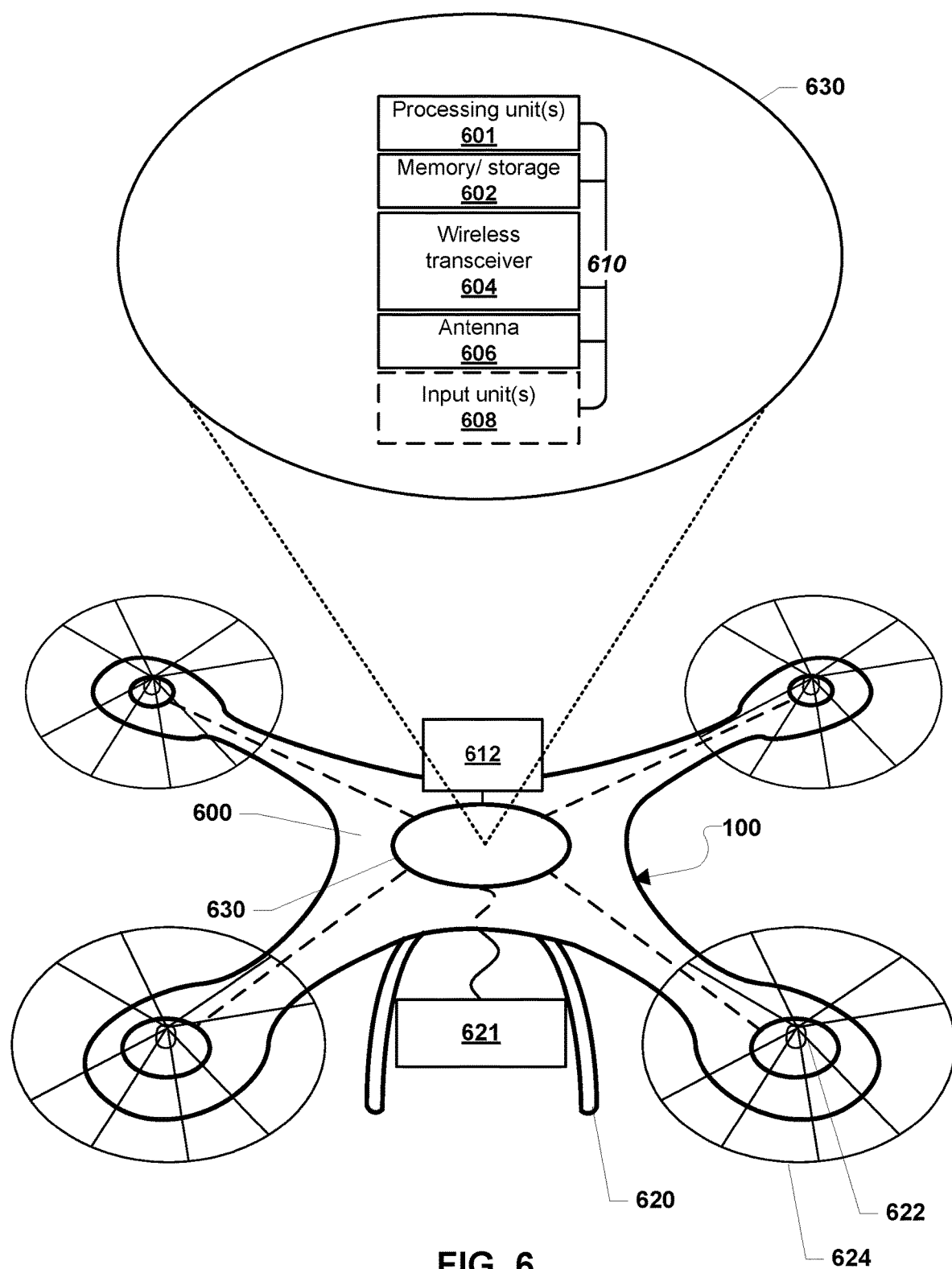
FIG. 6 is a component block diagram of a robotic vehicle suitable for use with the various embodiments.

The various embodiments may be implemented within a variety of robotic vehicles, an example of which in the form of a four-rotor robotic vehicle is illustrated in FIG. 6 that is suitable for use with the various embodiments including the embodiments described with reference to FIGS. 4-5. With reference to FIGS. 1-6, the robotic vehicle 100 may include a body 600 (i.e., fuselage, frame, etc.) that may be made out of any combination of plastic, metal, or other materials suitable for flight. The body 600 may include a processor 630 that is configured to monitor and control the various functionalities, subsystems, and/or other components of the robotic vehicle 100. For example, the processor 630 may be configured to monitor and control various functionalities of the robotic vehicle 100, such as any combination of modules, software, instructions, circuitry, hardware, etc. related to propulsion, navigation, power management, sensor management, and/or stability management.

The processor 630 may include one or more processing unit(s) 601, such as one or more processors configured to execute processor-executable instructions (e.g., applications, routines, scripts, instruction sets, etc.), a memory and/or storage unit 602 configured to store data (e.g., flight plans, obtained sensor data, received messages, applications, etc.), and a wireless transceiver 604 and antenna 606 for transmitting and receiving wireless signals (e.g., a Wi-Fi® radio and antenna, Bluetooth®, RF, etc.). In some embodiments, the robotic vehicle 100 may also include components for communicating via various wide area networks, such as cellular network transceivers or chips and associated antenna (not shown). In some embodiments, the processor 630 of the robotic vehicle 100 may further include various input units 608 for receiving data from human operators and/or for collecting data indicating various conditions relevant to the robotic vehicle 100. For example, the input units 608 may include camera(s), microphone(s), location information functionalities (e.g., a global positioning system (GPS) receiver for receiving GPS coordinates), flight instruments (e.g., attitude indicator(s), gyroscope(s), accelerometer(s), altimeter(s), compass(es), etc.), keypad(s), etc. The various components of the processor 630 may be connected via a bus 610 or other similar circuitry.

The body 600 may include landing gear 620 of various designs and purposes, such as legs, skis, wheels, pontoons, etc. The body 600 may also include a payload mechanism 621 configured to hold, hook, grasp, envelope, and otherwise carry various payloads, such as boxes. In some embodiments, the payload mechanism 621 may include and/or be coupled to actuators, tracks, rails, ballasts, motors, and other components for adjusting the position and/or orientation of the payloads being carried by the robotic vehicle 100. For example, the payload mechanism 621 may include a box moveably attached to a rail such that payloads within the box may be moved back and forth along the rail. The payload mechanism 621 may be coupled to the processor 630 and thus may be configured to receive configuration or adjustment instructions. For example, the payload mechanism 621 may be configured to engage a motor to re-position a payload based on instructions received from the processor 630.

The robotic vehicle 100 may be of a helicopter design that utilizes one or more rotors 624 driven by corresponding motors 622 to provide lift-off (or take-off) as well as other aerial movements (e.g., forward progression, ascension, descending, lateral movements, tilting, rotating, etc.). The robotic vehicle 100 may utilize various motors 622 and corresponding rotors 624 for lifting off and providing aerial propulsion. For example, the robotic vehicle 100 may be a "quad-copter" that is equipped with four motors 622 and corresponding rotors 624. The motors 622 may be coupled to the processor 630 and thus may be configured to receive operating instructions or signals from the processor 630. For example, the motors 622 may be configured to increase rotation speed of their corresponding rotors 624, etc. based on instructions received from the processor 630. In some embodiments, the motors 622 may be independently controlled by the processor 630 such that some rotors 624 may be engaged at different speeds, using different amounts of power, and/or providing different levels of output for moving the robotic vehicle 100. For example, motors 622 on one side of the body 600 may be configured to cause their corresponding rotors 624 to spin at higher revolutions per minute (RPM) than rotors 624 on the opposite side of the body 600 in order to balance the robotic vehicle 100 burdened with an off-centered payload.

The body 600 may include a power source 612 that may be coupled to and configured to power the various other components of the robotic vehicle 100. For example, the power source 612 may be a rechargeable battery for providing power to operate the motors 622, the payload mechanism 621, and/or the units of the processor 630.

The various processors described herein may be any programmable microprocessor, microcomputer or multiple processor chip or chips that can be configured by software instructions (applications) to perform a variety of functions, including the functions of the various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The processors 630 may be any programmable microprocessor, microcomputer or multiple processor chip or chips that can be configured by software instructions (applications) to perform a variety of functions, including the functions of various embodiments described above. In some mobile devices, multiple processors may be provided, such as one processor dedicated to wireless communication functions and one processor dedicated to running other applications. Typically, software applications may be stored in the internal memory 602 before they are accessed and loaded into the processors 630. The processors 630 may include internal memory sufficient to store the application software instructions. In many mobile devices, the internal memory may be a volatile or nonvolatile memory, such as flash memory, or a mixture of both. For the purposes of this description, a general reference to memory refers to memory accessible by the processors 630 including internal memory or removable memory plugged into the mobile device and memory within the processor processors 630 themselves.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described generally in terms of functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable software, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to some embodiments without departing from the scope of the claims. Thus, the claims are not intended to be limited to the embodiments shown herein but are to be accorded the widest scope consistent with the language of the claims and the principles and novel features disclosed herein.

What is claimed is:

1. A method performed by a processor of a robotic vehicle for detecting and responding to defects on an on-board imaging device that includes an image sensor, the method comprising:
   causing the imaging device to capture at least one image for use with an application, wherein the at least one image captured by the imaging device comprises an image of a reference element;
   determining whether masking image data applies to the application;
   determining whether a defect to the imaging device is detected based at least in part on the at least one captured image, comprising:
      comparing features of the captured image of the reference element to features of a baseline image of the reference element; and
      determining whether the features differ between the captured image and the baseline image by more than a threshold amount in any region of the captured image; and
   in response to determining that a defect to the imaging device is detected and that masking image data applies to the application:
      identifying an area of the image sensor corresponding to the defect;
      developing a protocol for masking image data received from the identified area of the image sensor specifically for use with the application;
      masking the image data received from the identified area of the image sensor according to the protocol for masking image data specifically for use with the application; and
      altering at least one of an operating mode or a flight path of the robotic vehicle based on a remaining area of the image sensor.

2. The method of claim 1, further comprising continuing active operation of the robotic vehicle in response to determining that a defect to the imaging device is detected.

3. The method of claim 2, wherein continuing active operation of the robotic vehicle comprises navigating the robotic vehicle using the image data received from the remaining area of the image sensor.

4. The method of claim 2, wherein continuing active operation of the robotic vehicle comprises utilizing a second image device of the robotic vehicle to perform navigation.

5. The method of claim 1, wherein the imaging device further includes at least one lens.

6. The method of claim 1, wherein masking image data received from the identified area of the image sensor according to the protocol for masking image data specifically for use with the application comprises excluding use of an area of pixels on the image sensor.

7. The method of claim 6, wherein excluding use of an area of pixels on the image sensor comprises excluding use of each pixel within the identified area of the image sensor.

8. The method of claim 6, wherein excluding use of an area of pixels on the image sensor comprises excluding use of a region of the image sensor in which the identified area is located.

9. The method of claim 1, further comprising causing motion of the on-board imaging device.

10. The method of claim 9, wherein causing motion of the imaging device comprises causing movement of the robotic vehicle.

11. The method of claim 9, wherein causing motion of the imaging device comprises causing rotation of a gimbal on which the imaging device is mounted.

12. The method of claim 9, wherein:
   the at least one captured image comprises two temporally-separated images; and
   determining whether a defect to the imaging device is detected comprises:
      identifying features within the temporally-separated images; and
      determining whether any identified feature maintains a fixed position between the temporally-separated images.

13. The method of claim 1, wherein determining whether a defect to the imaging device is detected is further based on data received from an inertial sensor of the robotic vehicle.

14. A robotic vehicle, comprising:
   a processor configured with processor-executable instructions to:
      cause an on-board imaging device having an image sensor to capture at least one image for use with an application, wherein the at least one image captured by the imaging device comprises an image of a reference element;
      determine whether masking image data applies to the application;
      determine whether a defect to the imaging device is detected based at least in part on the at least one captured image, by:
         comparing features of the captured image of the reference element to features of a baseline image of the reference element; and
         determining whether the features differ between the captured image and the baseline image by more than a threshold amount in any region of the captured image; and
      in response to determining that a defect to the imaging device is detected and that masking image data applies to the application:
         identify an area of the image sensor corresponding to the defect;
         develop a protocol to mask image data received from the identified area of the image sensor specifically for use with the application; and
         mask the image data received from the identified area of the image sensor according to the protocol to mask image data specifically for use with the application; and
         alter at least one of an operating mode or a flight path of the robotic vehicle based on a remaining area of the image sensor.

15. The robotic vehicle of claim 14, wherein the processor is further configured with processor-executable instructions to continue active operation of the robotic vehicle in response to determining that a defect to the imaging device is detected.

16. The robotic vehicle of claim 15, wherein the processor is further configured with processor-executable instructions to continue active operation of the robotic vehicle by navigating the robotic vehicle using the image data received from the remaining area of the image sensor.

17. The robotic vehicle of claim 15, wherein the processor is further configured with processor-executable instructions to continue active operation of the robotic vehicle by utilizing a second image device of the robotic vehicle to perform navigation.

18. The robotic vehicle of claim 14, wherein the imaging device further includes at least one lens.

19. The robotic vehicle of claim 14, wherein the processor is further configured with processor-executable instructions to mask image data received from the identified area of the image sensor according to the protocol to mask image data specifically for use with the application by excluding use of an area of pixels on the image sensor.

20. The robotic vehicle of claim 19, wherein the processor is further configured with processor-executable instructions to exclude use of an area of pixels on the image sensor by excluding use of each pixel within the identified area of the image sensor.

21. The robotic vehicle of claim 19, wherein the processor is further configured with processor-executable instructions to exclude use of an area of pixels on the image sensor by excluding use of a region of the image sensor in which the identified area is located.

22. The robotic vehicle of claim 14, wherein the processor is further configured with processor-executable instructions to cause motion of the on-board imaging device.

23. The robotic vehicle of claim 22, wherein the processor is further configured with processor-executable instructions to cause motion of the imaging device by causing movement of the robotic vehicle.

24. The robotic vehicle of claim 22, wherein the processor is further configured with processor-executable instructions to cause motion of the imaging device by causing rotation of a gimbal on which the imaging device is mounted.

25. A processing device configured for use in a robotic device and configured to:
  cause an on-board imaging device having an image sensor to capture at least one image for use with an application, wherein the at least one image captured by the imaging device comprises an image of a reference element;
  determine whether masking image data applies to the application;
  determine whether a defect to the imaging device is detected based at least in part on the at least one captured image, by:
    comparing features of the captured image of the reference element to features of a baseline image of the reference element; and
    determining whether the features differ between the captured image and the baseline image by more than a threshold amount in any region of the captured image; and
  in response to determining that a defect to the imaging device is detected and that masking image data applies to the application:
    identify an area of the image sensor corresponding to the defect;
    develop a protocol to mask image data received from the identified area of the image sensor specifically for use with the application; and
    mask the image data received from the identified area of the image sensor according to the protocol to mask image data specifically for use with the application; and
    alter at least one of an operating mode or a flight path of the robotic vehicle based on a remaining area of the image sensor.

* * * * *